(12) United States Patent
Ellison

(10) Patent No.: US 9,135,025 B2
(45) Date of Patent: Sep. 15, 2015

(54) LAUNCHER FOR SOFTWARE APPLICATIONS

(75) Inventor: Timothy Peter Ellison, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2056 days.

(21) Appl. No.: 11/736,067

(22) Filed: Apr. 17, 2007

(65) Prior Publication Data

US 2008/0016517 A1    Jan. 17, 2008

(30) Foreign Application Priority Data

May 18, 2006 (GB) .................. 0609843.8

(51) Int. Cl.
*G06F 9/445* (2006.01)

(52) U.S. Cl.
CPC .................. *G06F 9/445* (2013.01)

(58) Field of Classification Search
None
See application file for complete search history.

(56) References Cited

U.S. PATENT DOCUMENTS

| | | | |
|---|---|---|---|
| 5,615,400 A * | 3/1997 | Cowsar et al. | 719/332 |
| 6,385,644 B1 * | 5/2002 | Devine et al. | 709/206 |
| 6,513,157 B1 * | 1/2003 | Glass | 717/165 |
| 6,901,588 B1 * | 5/2005 | Krapf et al. | 717/164 |
| 2002/0059470 A1 * | 5/2002 | Allard et al. | 709/315 |
| 2002/0104077 A1 * | 8/2002 | Charnell et al. | 717/162 |
| 2002/0120793 A1 * | 8/2002 | Guthrie et al. | 709/330 |
| 2003/0023599 A1 * | 1/2003 | Garcia et al. | 707/10 |
| 2006/0020930 A1 * | 1/2006 | Hemi | 717/136 |
| 2007/0150749 A1 * | 6/2007 | Monaghan et al. | 713/189 |

* cited by examiner

*Primary Examiner* — Tuan Dao
(74) *Attorney, Agent, or Firm* — Thomas E. Lees, LLC

(57) ABSTRACT

A method for executing an application in an application class library by an application launcher software component, the application launcher software component having associated a name, the method comprising the steps of: deriving a unique application class identifier from the name of the application launcher software component; and instantiating an application class having the application class identifier.

26 Claims, 5 Drawing Sheets

LAUNCHER FOR SOFTWARE APPLICATIONS

FIELD OF THE INVENTION

The present invention relates to a launcher for software applications. In particular, it relates to a common launcher for multiple different platform independent software applications.

BACKGROUND OF THE INVENTION

The Java Development Kit (JDK) comprises a Java runtime system plus applications usch as tools and utilities that are pertinent to the development of java-based programs. For example, a JDK will usually contain such development tools as a java source to class file compiler (javac.exe), a java archiving tool (jar.exe), a security policy editor (policytool.exe) in addition to the generic Java program launcher (java.exe) (Java is a registered trademark of Sun Microsystems Inc).

Such tools and utilities are usually implemented using the Java language itself and are therefore platform independent. Each tool can be made accessible to anend user as a platform specific excutable that is a customized version of the generic Java launcher java.exe. In some cases the java code and launcher software components are built into a native executable (such as through the use of a conversion tool java2exe), although in this way platform independence is lost. Alternatively, a custom launcher software component is employed for each application which provides a unqique platform dependent executable application for each tool whilst retaining the platform independence of the java implemented tool itself. Each custom launcher invokes an application as a well defined type in an application class library such as a Java archive file. For example, tooling applications are convetionally stored in tools.jar.

The maintenance of multiple different custom launcher software components for different applications is resource intensive especially where it is necessary to effect a change in all launcher software components. It would therefore be advantageous to provide for the use of a common application launcher software component whilst retaining the ability to provide a unique executable file per application but without the need to convert platform independent applications to platform dependent executable format.

SUMMARY OF THE INVENTION

The present invention provides, in a first aspect, a method for executing an application in an application class library by an application launcher software component, the application launcher software component having associated a name, the method comprising the steps of: deriving a unique application class identifier from the name of the application launcher software component; and instantiating an application class having the application class identifier.

Thus the application launcher software component instantiates an application class based on a name associated with the application launcher software component. In this way it is possible to have an identical application launcher software component for multiple application classes which differ in terms of the name. This provides for each application class to be provided with a uniquely named executable application launcher software component, and provides for improved serviceability of maultiple application launcher sotware components 202 since they are functionally identical.

The present invention provides, in a second aspect, an apparatus for executing an application in an application class library by an application launcher software component, the application launcher software component having associated a name, the apparatus comprising: means for deriving a uniquue application class identifier from the name of the application launcher software component; and means for instantiating an application class having the application class identifier.

The present invention provides, in a third aspect, an apparatus comprising: a central processing unit; a memory subsystem/ an input/output subsystem; and a bus subsystem interconnecting the central processing unit, the memory subsystem, the input/output subsystem; and the apparatus described above.

The present invention provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENTS

Figure 1:
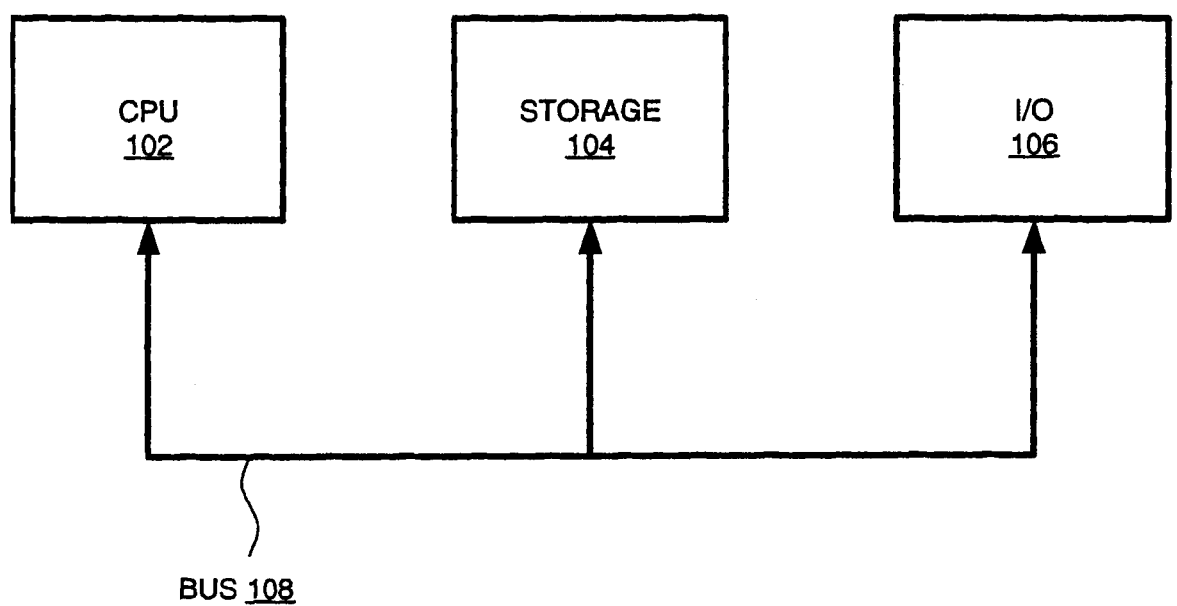
FIG. 1 is a block diagram of a computer system sutiable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
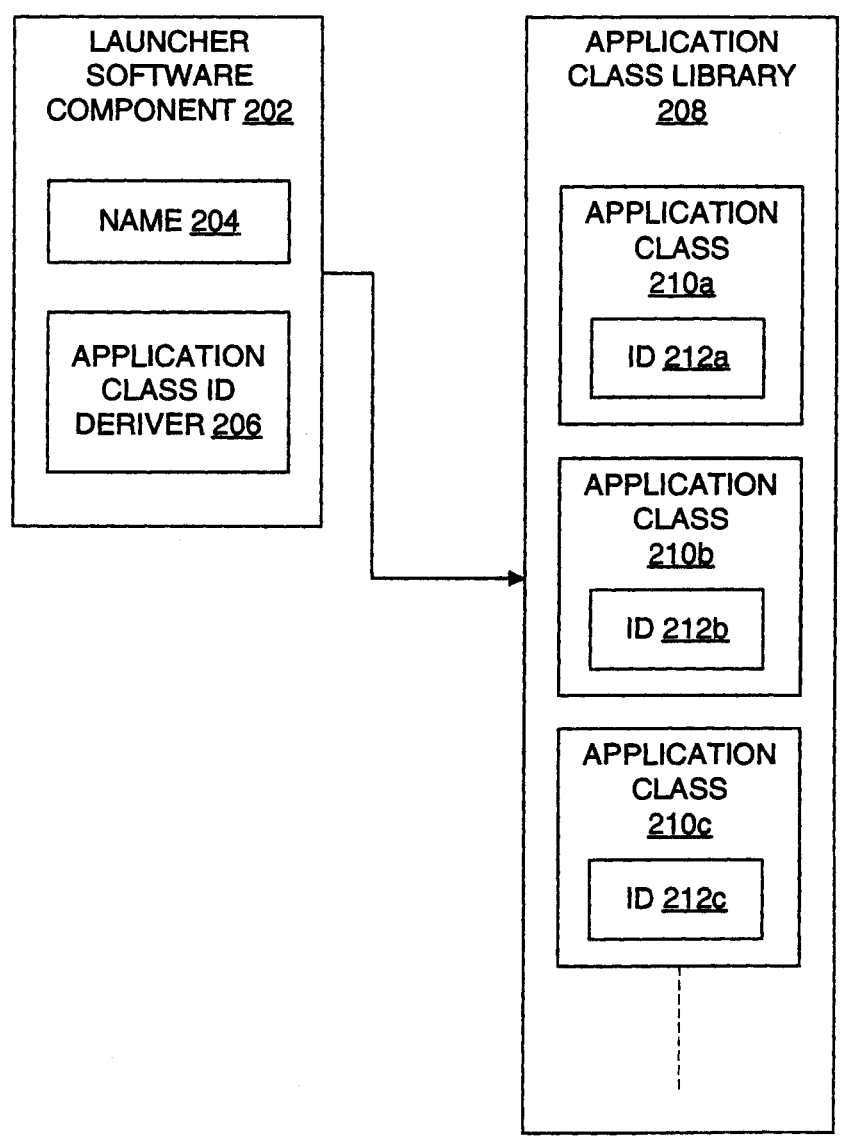
FIG. 2 is a block diagram of an application launcher software component for instantiating an application class in accordance with a preferred embodiment of the present invention.

FIG. 2 is a block diagram of an application launcher software component 202 for instantiating an application class 210 in accordance with a preferred embodiment of the present invention. The application launcher software component 202 is an executable software routine for executing an application by instantiating an application class 210. For example, the application launcher software component 202 is a platform dependent executable file, such as an "exe" file. Application classes 210 are stored in an application class library, such as a Java archive file (JAR). Each application class 210 has associated an application class identifier 212, such as a class name. The application launcher software component 202 has associated a name 204, such as a filename, for identifying the application launcher software component 202. The name 204 further represents an application class 210, and thus provides a link between the launcher software component 202 and a particular application class 210. The application launcher software component 202 further includes an application class identifier deriver 206. The application class identifier deriver 206 is a software or hardware component for deriving an identifier 212 of an application class 210 in an application class library 208. The identifier 212 is derived from the name 204 associated with the application launcher software component 202.

The application class identifier deriver 206 can derive the identifier 212 of an application class 210 in one of many ways. For example, the identifier 212 may be identical to the name 204 of the application launcher software component 202. Alternatively, the application launcher software component 202 can be supplemented with a prefix or suffix to generate the identifier 212 of an application class 210. For example, an application launcher software component 202 having a name 204 of "policytool.exe" may be translated by the application class identifier deriver 206 into an application class identifier 212 of "com.ibm.javatools.security.PolicyTool". In a further alternative, the application class identifier deriver 206 may use the name 204 associated with the application luancher software component 202 to lookup a corresponding identifier 212 of an application class 210 in, for example, a lookup table or database. In yet a further alternative, the application class identifier deriver 206 may operate based on rules which strictly define how the name 204 is to be translated into an identifier 212 of an application class 210. An appropriate form and construction of such rules will be readily apparent to those skilled in the art and a detailed explanation of such rules is not considered necessary here.

Thus, by way of the application class identifier deriver 206, the application launcher software component is able to instantiate an application class 210 based on its associated name 204. Thus, in use, multiple copies of the application launcher software component 202 can be made which differ in the name 204 associated with each. In this way it is possible to have an identical application launcher software component 202 for multiple application classes 210 which differ in terms of the name 204. This provides for each application class 210 to be provided with a uniquely named executable application launcher software component 202, and provides for improved serviceability of maultiple application launcher software components 202 since they are functionally identical.

Figure 3:
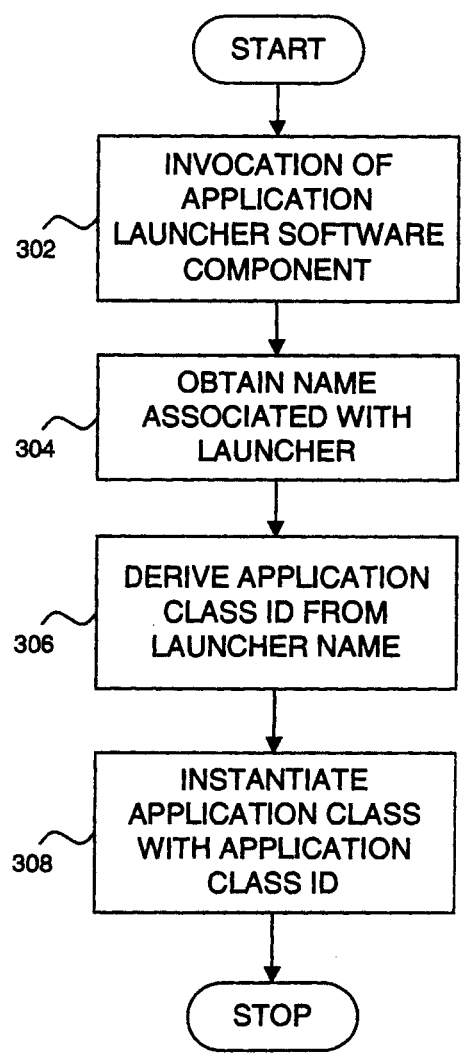
FIG. 3 is a flowchart illustrating a method of the application launcher software component of FIG. 2 in accordance with the preferred embodiment of the present invention.

FIG. 3 is a flowchart illustrating a method of the application launcher software component 202 of FIG. 2 in accordance with the preferred embodiment of the present invention. At step 302 the application launcher software component 202 is executed. At step 304 the name 204 associated with the application launcher software component is obtained. At step 306 a class identifier 212 of a desired application class 210 is derived from the name 204 using one or more of the techniques described above. Finally, at step 308 the desired application is executed by instantiating the application class 210 having the identifier 212 derived at step 306.

Figure 4:
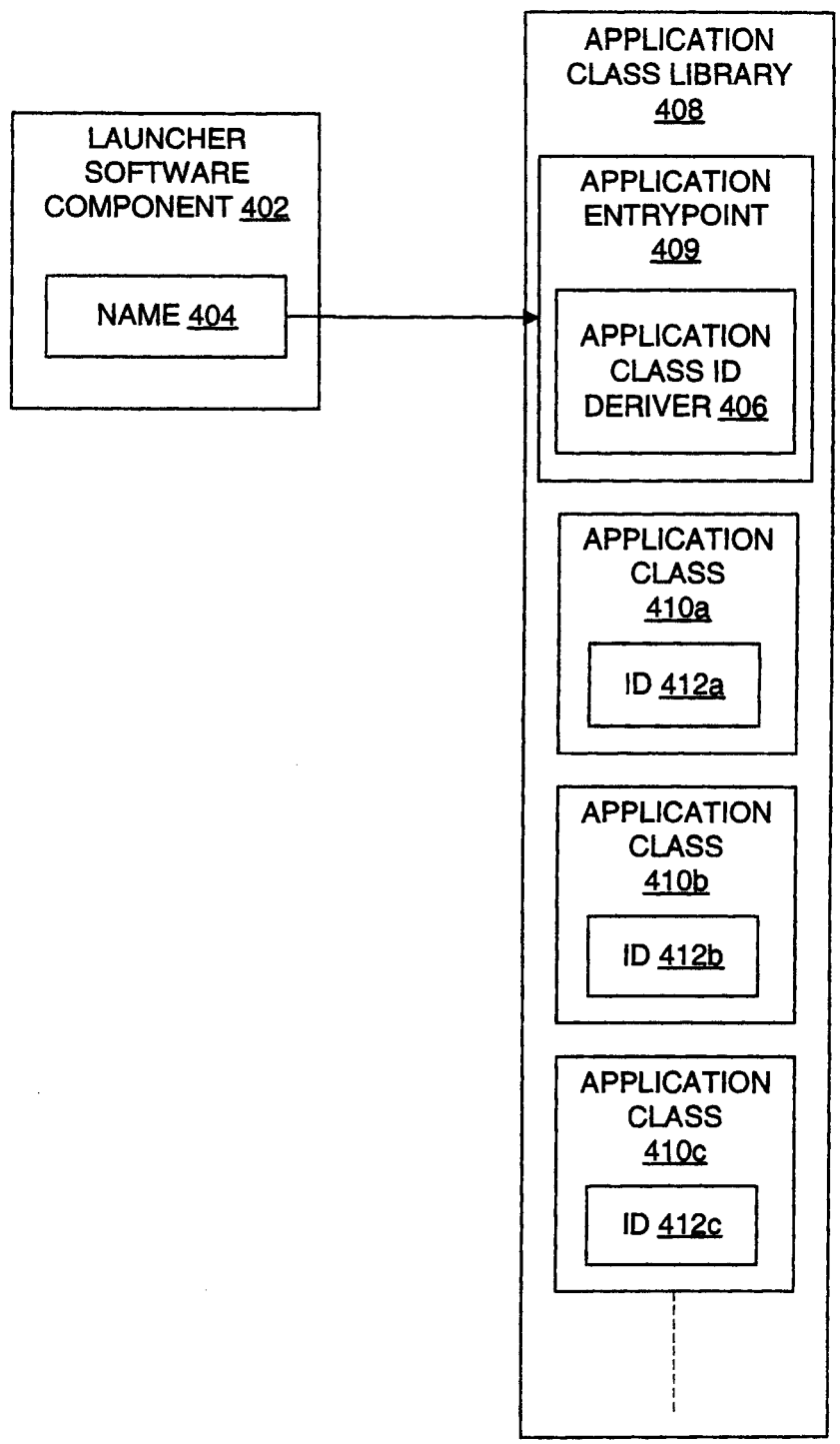
FIG. 4 is a block diagram of an application launcher software component for instantiating an application class in accordance with an alternative embodiment of the present invention.

FIG. 4 is a block diagram of an application launcher software component 402 for instantiating an application class 410 in accordance with an alternative embodiment of the present invention. Many of the elements of FIG. 4 are identical to those described above with respect to FIG. 2 and these will not be repeated here. FIG. 4 otherwise differs from Figure 2 in that an application entrypoint 409 is provided in the application library 408 for the provision of the function of the application class identifier deriver 406. Entrypoint 409 is a software routine, subroutine, method, procedure, function or program which is callable by the launcher software component 402 to instantiate an application class 410. Whilst the application entrypoint 409 is illustrated as being contained in the application class library 408, it could alternatively be located in an alternative class library or as a standalone class. When executed, the application launcher software component 402 instantiates the application entrypoint 409 sending as an argument the name 404 associated with the application luancher software component 402. It is the application entrypoint 409 which undertakes the translation (if any) of the name 404 into a class identifier 212. in this way, the embodiment of FIG. 4 allows for the provision of the application class identifier deriver 406 as plantform independent code outside of the application luancher software component 402. Thus, the application luancher software component 402 is functionally smaller in the embodiment of FIG. 4 so requiring less maintenance and a smaller amount of platform dependent code.

Figure 5:
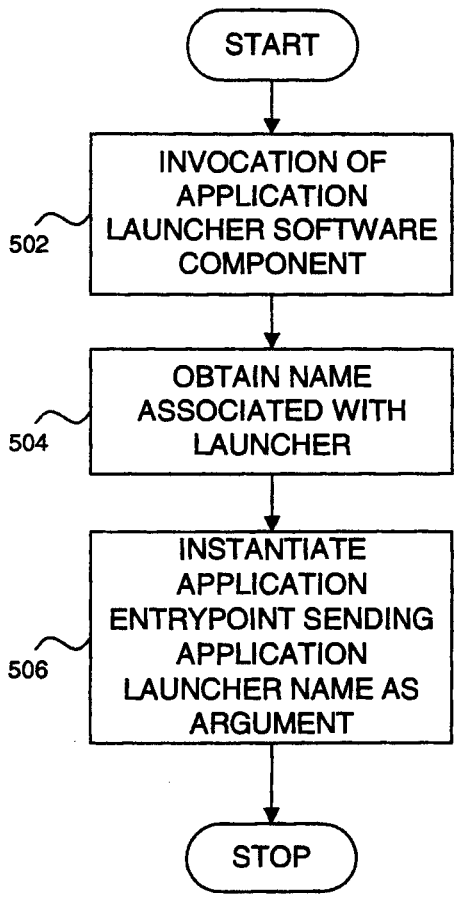
FIG. 5 is a flowchart illustrating a method of the application launcher software component of FIG. 4 in accordance with the alternative embodiment of the present invention.

FIG. 5 is a flowchart illustrating a method of the application launcher software component 402 of FIG. 4 in accordance with the alternative embodiment of the present invention. At step 502 the application launcher software component 402 is executed. At step 504 the name 404 associated with the application launcher software component is obtained. Finally, at stp 506, the application entrypoint 409 is instantiated sending the name 404 associated with the application launcher software component as an argument.

Figure 6:
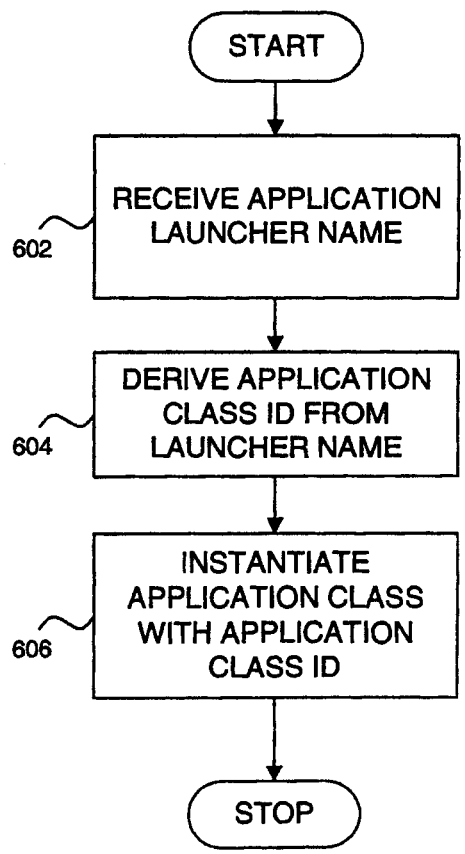
FIG. 6 is a flowchart illustrating a method of the application entrypoint of FIG. 4 in accordance with the alternative embodiment of the present invention.

FIG. 6 is a flowchart illustrating a method of the application entrypoint 409 of FIG. 4 in accordance with the alternative embodiment of the present invention. At step 602 the name 404 associated with the application launcher software component 402 is received by the application entrypoint 409. At step 604 a class identifier 412 of a desired application class 410 is derived from the name 404 using one or more of the techniques for deriving application class identifiers described earlier. Finally, at step 606 the desired application is executed by instantiating the application class 410 having the identifer 412 derived at step 604.

Insofar as embodiments of the invention described are implementable, at least in part, using a software-controlled programmable processing device, such as a microprocessor, digital signal processor or other processing device, data processing apparatus or ystem, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as a object code, for example.

Suitably, the computer program is stored on a carrier medium in machine or device readable form, for example in solid-state memory, magnetic memory such as disk or tape, optically or magneto-optically readable memory such as compact disk or digital versatile disk etc, and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fell within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with thos of the independent claims and features from respective independent claims may be combined in any appropriate manner and not merely in the specific combinations enumerated is the claims.

The invention claimed is:

1. A method for executing a desired application, comprising:
    invoking an application launcher software component having a unique name, where the unique name identifies the application launcher software component and represents a particular application class corresponding to the desired application;
    invoking, by the application launcher software component, an application class identifier deriver;
    obtaining, by the application class identifier deriver, the unique name of the application launcher software component;
    deriving a unique application class identifier using the obtained unique name of the application launcher software component, wherein the unique application class identifier identifies the particular application class in an application class library; and
    executing the desired application by instantiating into memory of a computer system, the particular application class stored in an application class library having the unique application class identifier;
    wherein:
    the application class identifier deriver is included as part of the application launcher software component.

2. The method of claim 1, wherein deriving a unique application class identifier further comprises converting the name of the application launcher software component into a class identifier by the application launcher software component.

3. The method of claim 1, wherein deriving a unique application class identifier further comprises deriving the unique application class identifier by supplementing the name associated with the application launcher software component with at least one of a prefix and a suffix, to generate the unique application class identifier of the application class desired for instantiation.

4. The method of claim 1, wherein deriving a unique application class identifier further comprises deriving the unique application class identifier by using the name associated with the application launcher software component to lookup the corresponding unique application class identifier in at least one of a lookup table and database.

5. The method of claim 1, wherein deriving a unique application class identifier further comprises operating based on rules that strictly define how the name of the application launcher software component is to be translated into the unique application class identifier.

6. The method of claim 1, further comprising:
    providing for each of a plurality of application classes stored in the application class library, an associated uniquely named executable application launcher software component, where each executable application launcher software component is functionally identical and differs from other executable application launcher software components in terms of the unique application launcher software component name;
    wherein:
    deriving a unique application class identifier from a name associated with an application launcher software component, further comprises:
        obtaining the name associated with the executing application launcher software component; and
        deriving the unique application class identifier from the name of the obtained name associated with the executing application launcher software component.

7. The method of claim 6, wherein the application launcher software component is platform dependent, the application class identifier deriver is platform independent and the application class library is platform independent.

8. The method of claim 6, wherein the application launcher software component is unaware of which application class to instantiate until the application class identifier deriver derives the application class identifier.

9. The method of claim 1, wherein the application launcher software component is platform dependent, the application class identifier deriver is platform independent, and the application class library is platform independent.

10. The method of claim 1, wherein the application launcher software component is unaware of which application class to instantiate until the application class identifier deriver derives the application class identifier.

11. An apparatus for executing a desired application, the apparatus comprising:
    a microprocessor coupled to a memory, wherein the microprocessor is programmed to execute the application by:
        invoking an application launcher software component having a unique name, where the unique name identifies the application launcher software component and represents a particular application class corresponding to the desired application;
        invoking, by the application launcher software component, an application class identifier deriver;
        obtaining, by the application class identifier deriver, the unique name of the application launcher software component;
        deriving a unique application class identifier using the obtained unique name of the application launcher software component, wherein the unique application class identifier identifies the particular application class in an application class library; and
        executing the desired application by instantiating into memory of a computer system, the particular application class stored in an application class library having the unique application class identifier;
        wherein:
        the application class identifier deriver is included as part of the application launcher software component.

12. The apparatus of claim 11 wherein deriving the unique application class identifier includes converting the name of the application launcher software component into a class identifier.

13. The apparatus of claim 11, wherein the microprocessor is further programmed to execute deriving a unique application class identifier by deriving the unique application class identifier by supplementing the name associated with the application launcher software component with at least one of a prefix and a suffix, to generate the unique application class identifier of the application class desired for instantiation.

14. The apparatus of claim 11, wherein the microprocessor is further programmed to execute deriving a unique application class identifier by deriving the unique application class identifier by using the name associated with the application launcher software component to lookup the corresponding unique application class identifier in at least one of a lookup table and database.

15. The apparatus of claim 11, wherein the microprocessor is further programmed to execute deriving a unique application class identifier by operating based on rules that strictly define how the name of the application launcher software component is to be translated into the unique application class identifier.

16. The apparatus of claim 11, wherein the microprocessor is further programmed to execute:
providing for each of a plurality of application classes stored in the application class library, an associated uniquely named executable application launcher software component, where each executable application launcher software component is functionally identical and differs from other executable application launcher software components in terms of the unique application launcher software component name;
wherein:
deriving a unique application class identifier from a name associated with an application launcher software component, further comprises:
obtaining the name associated with the executing application launcher software component; and
deriving the unique application class identifier from the name of the obtained name associated with the executing application launcher software component.

17. The apparatus of claim 11, wherein the microprocessor is further programmed to execute the application launcher software component as platform dependent, the application class identifier deriver as platform independent, and the application class library as platform independent.

18. The apparatus of claim 11, wherein the microprocessor is further programmed to execute the application launcher software component as being unaware of which application class to instantiate until the application class identifier deriver derives the application class identifier.

19. Computer readable storage hardware having computer readable instructions stored thereon to cause a computer to execute a desired application, the stored computer program product comprising instructions for:
invoking an application launcher software component having a unique name, where the unique name identifies the application launcher software component and represents a particular application class corresponding to the desired application; invoking, by the application launcher software component, an application class identifier deriver;
obtaining, by the application class identifier deriver, the unique name of the application launcher software component;
deriving a unique application class identifier using the obtained unique name of the application launcher software component, wherein the unique application class identifier identifies the particular application class in an application class library; and
executing the desired application by instantiating into memory of a computer system, the particular application class stored in an application class library having the unique application class identifier;
wherein:
the application class identifier deriver is included as part of the application launcher software component.

20. The computer readable storage hardware of claim 19, wherein the instructions stored on the computer readable storage medium execute so as to derive the unique application class identifier as being identical to the name associated with the application launcher software component.

21. The computer readable storage hardware of claim 19, the instructions stored on the computer readable storage medium execute so as to supplement the name associated with the application launcher software component with at least one of a prefix and a suffix, to generate the unique application class identifier of the application class desired for instantiation.

22. The computer readable storage hardware of claim 19, the instructions stored on the computer readable storage medium execute so as to use the name associated with the application launcher software component to lookup the corresponding unique application class identifier in at least one of a lookup table and database.

23. The computer readable storage hardware of claim 19, wherein the instructions stored on the computer readable storage medium execute deriving a unique application class identifier by operating based on rules that strictly define how the name of the application launcher software component is to be translated into the unique application class identifier.

24. The computer readable storage hardware of claim 19, wherein the instructions stored on the computer readable storage medium execute:
providing for each of a plurality of application classes stored in the application class library, an associated uniquely named executable application launcher software component, where each executable application launcher software component is functionally identical and differs from other executable application launcher software components in terms of the unique application launcher software component name;
wherein:
deriving a unique application class identifier from a name associated with an application launcher software component, further comprises:
obtaining the name associated with the executing application launcher software component; and
deriving the unique application class identifier from the name of the obtained name associated with the executing application launcher software component.

25. The computer readable storage hardware of claim 19, wherein the instructions stored on the computer readable storage medium execute the application launcher software component as platform dependent, the application class identifier deriver as platform independent, and the application class library as platform independent.

26. The computer readable storage hardware of claim 19, wherein the instructions stored on the computer readable storage medium execute the application launcher software component as unaware of which application class to instantiate until the application class identifier deriver derives the application class identifier.

* * * * *